US008851973B2

(12) United States Patent
Mayeroff et al.

(10) Patent No.: US 8,851,973 B2

(45) Date of Patent: *Oct. 7, 2014

(54) METHOD, SYSTEM, AND DEVICE FOR CONDUCTING A GAMBLING GAME TO ISSUE AN ESCROW AWARD

(71) Applicants: Jason Mayeroff, Reno, NV (US); Robert Ryan Morishita, Las Vegas, NV (US)

(72) Inventors: Jason Mayeroff, Reno, NV (US); Robert Ryan Morishita, Las Vegas, NV (US)

(73) Assignee: Battle Born Gaming, Inc., Victoria (SC)

( * ) Notice: Subject to any disclaimer, the term of this patent is extended or adjusted under 35 U.S.C. 154(b) by 0 days.

This patent is subject to a terminal disclaimer.

(21) Appl. No.: 14/162,629

(22) Filed: Jan. 23, 2014

(65) Prior Publication Data

US 2014/0141870 A1 May 22, 2014

Related U.S. Application Data

(63) Continuation-in-part of application No. 11/827,574, filed on Jul. 11, 2007, now Pat. No. 8,668,573, and a continuation-in-part of application No. 11/900,277, filed on Sep. 10, 2007.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3244* (2013.01); *G07F 17/3211* (2013.01)

USPC .................. 463/20; 463/16; 463/25; 463/26; 463/32; 463/34

(58) Field of Classification Search

USPC .............................. 463/16, 20, 25, 26, 32, 34

See application file for complete search history.

(56) References Cited

U.S. PATENT DOCUMENTS

| | | | |
|---|---|---|---|
| 5,513,846 | A | 5/1996 | Niederlein et al. |
| 5,697,843 | A | 12/1997 | Manship et al. |
| 6,059,658 | A | 5/2000 | Mangano et al. |
| 6,089,978 | A | 7/2000 | Adams |
| 6,146,273 | A | 11/2000 | Olsen |
| 6,149,273 | A | 11/2000 | Matthews |
| 6,155,925 | A | 12/2000 | Giobbi |
| 6,203,429 | B1 | 3/2001 | Demar et al. |
| 6,315,666 | B1 | 11/2001 | Mastera et al. |
| 6,336,863 | B1 | 1/2002 | Baerlocher et al. |
| 6,416,409 | B1 | 7/2002 | Jordan |

(Continued)

*Primary Examiner* — Adetokunbo O Torimiro

(74) *Attorney, Agent, or Firm* — Robert Ryan Morishita Morishita Law Firm, LLC

(57) ABSTRACT

A user device is programmed to display a game application outcome. Among the possible outcomes is at least one escrow award which may be earned through the game application but is not issued at the user device. When an escrow award is earned, it is stored at an award server, optionally in association with a player identifier. A gaming device includes a primary display for displaying a gambling game and an escrow display to display escrow awards retrieved from the award server (optionally in response to receipt of a player identifier). A gambling game is conducted and resolved. Through the course of conducting one or more gambling games, a determination is made whether an escrow award trigger has occurred and, if so, an escrow award is issued. Optionally, an escrow award is held at the escrow display until an escrow display refresh event.

27 Claims, 5 Drawing Sheets

(56) References Cited

U.S. PATENT DOCUMENTS

| | | | |
|---|---|---|---|
| 7,088,692 | B1 | 8/2006 | Gronroos |
| 7,470,181 | B2 | 12/2008 | Gauselmann |
| 7,736,228 | B2 | 6/2010 | Seelig et al. |
| 2002/0065126 | A1 | 5/2002 | Miller et al. |
| 2003/0013516 | A1 | 1/2003 | Walker et al. |
| 2003/0060258 | A1 | 3/2003 | Coleman et al. |
| 2003/0060277 | A1 | 3/2003 | Webb et al. |
| 2003/0060281 | A1 | 3/2003 | Vancura |
| 2003/0186739 | A1 | 10/2003 | Paulsen et al. |
| 2004/0018871 | A1 | 1/2004 | Seelig et al. |
| 2004/0092315 | A1 | 5/2004 | Boyd et al. |
| 2004/0248642 | A1 | 12/2004 | Rothschild |

METHOD, SYSTEM, AND DEVICE FOR CONDUCTING A GAMBLING GAME TO ISSUE AN ESCROW AWARD

RELATED APPLICATION DATA

The present application is a continuation-in-part of U.S. patent application Ser. No. 11/827,574, entitled "Method and Device for Issuing a Bonus Award," filed Jul. 11, 2007, and a continuation-in-part of U.S. patent application Ser. No. 11/900,277, entitled "Gaming System and Method of Operation," filed Sep. 10, 2007.

FIELD OF THE INVENTION

The present invention relates to methods, systems, and devices for conducting wagering games. More specifically, the present invention includes methods, systems, and devices for receiving an escrow award from an award server at a gaming device which, in turn, received the escrow award from a user device, such that an escrow award that is earned, but not issued at a user device, is available to be awarded at a gaming device.

BACKGROUND OF THE INVENTION

Gaming devices take many forms, such as video gaming devices which conduct video reel slot machine games or video card games, mechanical slot machines, electronic table games, or the like. However, all these gaming devices issue awards similarly. That is, the awards are issued to the player in currency or a form representing currency.

For example, in a typical gaming device, currency is deposited into the gaming device via a bill acceptor, or a voucher representing currency is deposited into the gaming device via a ticket receiver. The amount deposited is tracked as gaming credits in a credit register in the gaming device. Casino gaming devices are well known in the art. Such devices may be embodied as spinning reel slot machines, video slot machines, video poker machines or the like. These machines are played by a player making a wager and prompting play. A game processor, such as a computer processor, selects and displays an outcome. In a typical slot machine, card game machine, or the like, the processor selects and displays an outcome by randomly selecting and displaying game indicia (such as slot reel symbols, playing cards, or the like). A determination is made whether the outcome is a winning or losing outcome based on the combination of game indicia selected and displayed. Depending on the type of game, the combinations may be examined based on some predefined constraint such as predefined pay lines, or the like. While different games treat awards different, generally speaking, the player is rewarded for winning outcomes and winnings are added to the credit register. Losing outcomes usually result in the loss of the player's wager, e.g. the player's wager amount is retained by the gaming device. Upon completing a play session, the player depresses a "cash out" button and the balance in the credit register is provided to the player in the form of cash, coin, or, more commonly, a voucher.

It has become popular to provide gaming devices with secondary features, such as bonus games, side bets, bonus awards, secondary games, or the like. For example, in a conventional bonus feature gaming device, a player places a wager and plays a base game to conclusion. If the outcome of the base game includes a trigger condition, a bonus feature is enabled. The bonus feature may entail the display of bonus outcome selections where the player makes a selection to reveal a bonus. In another popular game, a bonus feature is embodied as an electro-mechanical wheel that spins to display a bonus amount.

Gaming devices often include displays of bonus award amounts to attract and entice players to the gaming device. However, most bonus award amounts in existing gaming devices are static, i.e., do not change. Those bonus award amounts that do change, do so because they are funded as progressive awards. Such progressive bonus award amounts constitute a progressive pool to which a portion of the player's wager is contributed. Thus, the progressive pool from which the progressive bonus award amount is derived, grows with each wager received for play of the game. The consequence of this is that, while progressive bonus award amounts change, they are (a) not personalized to the player and (b) are not based on the player's activity on the gaming device, let alone the player's activities outside the casino.

SUMMARY OF THE INVENTION

The present invention includes a gaming system. In one optional embodiment, a gaming system includes a user device. Optionally, the user device includes a user device processor and a user device memory in communication with the user device processor. In one optional embodiment, the user device memory stores program instructions executable by the user device processor to display an outcome of a game application at the user device. In one such optional embodiment, the user device processor conducts the game application and displays the outcome at the user device. In another optional embodiment, the game application is conducted remotely and the outcome is transmitted to the user device processor, which displays the outcome at the user device. The outcome of the game application may include an escrow award. If the outcome of a game application includes an escrow award, the escrow award may be displayed at the user device. However, the user device does not issue the escrow award.

A system includes an award server in communication with the user device. In an optional embodiment, the award server includes an award server processor and an award server memory in communication with the award server processor. The award server memory stores program instructions executable by the award server processor to receive an escrow award from the user device. That is, rather than issuing any escrow award at a user device, the escrow award is stored at an award server for later application. In an optional embodiment, the award server stores the escrow award in association with a player identifier. Optionally, the award server may be configured to share and/or give escrow awards. For example, in one optional embodiment, the award server processor executes program instructions to receive a transfer request, e.g., a share request, including a first player identifier associated with an escrow award and a second player identifier. In response to the transfer request, the award server processor associates the escrow award with the second player identifier. In a further optional embodiment, the award server processor may disassociate the escrow award with the first player identifier in response to a transfer request, e.g., a gift request.

A system includes at least one gaming device in communication with the award server. The gaming device is separate from the award server and operates independently from the award server. Similarly, the gaming device is separate from the user device and operates independently from the user device.

A gaming device includes a gaming device processor. In an optional embodiment, the gaming device processor includes a random number generator, to generate a random number used, at least in part, to generate an outcome for a gambling game. The gaming device also includes a gaming device interface and an escrow display, both of which are in communication with the gaming device processor.

The gaming device includes a gaming device memory in communication with the gaming device processor. In an optional embodiment, the gaming device memory stores at least one escrow award trigger and program instructions executable by the gaming device processor. In a further optional embodiment, the gaming device memory also stores at least one escrow display refresh event.

In one optional embodiment, the program instructions executable by the gaming device processor include receiving an escrow award from the award server. In an optional embodiment, the escrow award stored at the award server are each associated with a player identifier. In such an optional embodiment, a player identifier is received through the gaming device interface and the escrow award received from the award server is an escrow award associated with a player identifier received.

The escrow award is displayed on the escrow display and a wager on the gambling game is received through the gaming device interface. The gaming device processor conducts the gambling game. In an optional embodiment, conduct of the gambling game includes randomly selecting an outcome for the gambling game by the gaming device processor. The wager is resolved by the gaming device processor based on the outcome of the gambling game.

The gaming device processor determines whether the escrow award trigger has occurred. In one optional embodiment, the escrow award trigger may be determined, at least in part, by the outcome of the gambling game generated by the gaming device processor. In another optional embodiment, the escrow award trigger may be independent of the outcome of the gambling game generated by the gaming device processor. The escrow award is issued by the gaming device when the at least one escrow award trigger occurs.

In an optional embodiment, the escrow award is held at the escrow display until the occurrence of the at least one escrow award trigger. In another optional embodiment, the escrow award is held at the escrow display until the occurrence of the at least one escrow award trigger or an escrow display refresh event, whichever occurs first. Examples of escrow display refresh events may include a predefined quantity of gambling games such that the escrow award is available to be issued for only a predefined quantity of gambling games. Another example of an escrow display refresh event is a random quantity of gambling games such that the escrow award is available to be issued for only a random quantity of gambling games. Yet another example of an escrow display refresh event is removal of a player identifier such that the escrow award is available to be issued only in gambling games conducted while in receipt of the player identifier associated with the escrow award. In an optional embodiment, the escrow award is removed from the escrow display upon the occurrence of the at least one escrow award trigger or an escrow display refresh event, whichever occurs first. In another optional embodiment, the escrow award is removed from the escrow display only upon the occurrence of an escrow display refresh event. In yet another optional embodiment, the escrow award is removed from the escrow display only upon the occurrence of the at least one escrow award trigger.

DESCRIPTION

Figure 1:
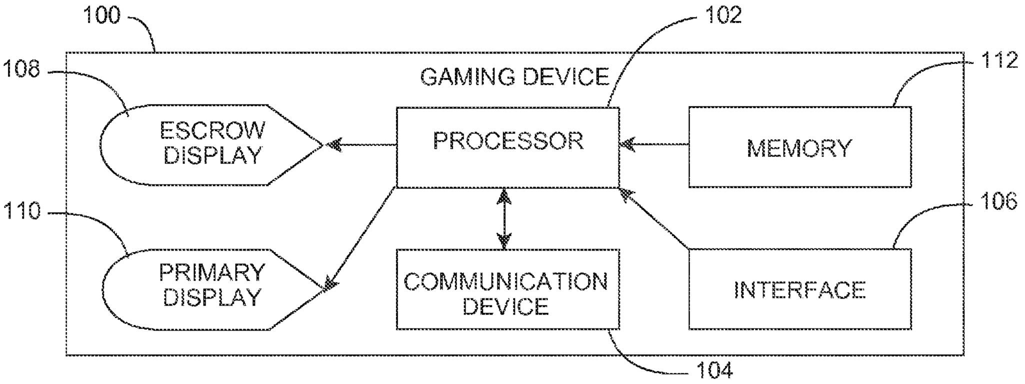
FIG. 1 is a block diagram of a gaming device according to an embodiment of the present invention.

Reference is now made to the figures wherein like parts are referred to by like numerals throughout. Referring generally to FIGS. 1-7, the present invention is directed to methods, systems, and devices for conducting gaming. The invention includes one or more gaming devices 100. The gaming device 100 may take any form. The gaming device 100 includes a gaming device processor 102 and a gaming device communication device 104 communicating with, and under the control of, the gaming device processor 102. The gaming device processor 102 operates a random number generator; the random number generator may be hardware, software, an embedded device, a combination thereof, or the like. The gaming device communication device could take any form, such as a modem, router, hub, network interface card ("NIC") or other device adapted to transmit and receive data. In an optional embodiment, the gaming device additionally includes an gaming device interface 106 communicating with the gaming device processor 102. The gaming device may include, or otherwise communicate with, an escrow display 108. The escrow display 108 may be incorporated into a primary display 110 (i.e., the gaming device may include a single display) or may be separate from a primary display 110 (i.e., the gaming device may include two separate displays). In either case, the gaming device processor 102 may communicate directly with the escrow display 108 or may communicate with the escrow display via an intermediary controller, such as a video display card or the like.

The gaming device processor 102 communicates with gaming device memory 112 which stores program instructions to conduct a method as described in greater detail below. Additionally, the gaming device memory 112 may store parameters and other data to conduct a method, such as one or more escrow award triggers and one or more escrow display refresh events (described in greater detail below). In an optional embodiment, the gaming device 100 is configured to conduct a gambling game by receiving a wager (or designation of a wager) though the gaming device interface 106 and utilize a random number generator to produce an outcome, which is then displayed at the gaming device primary display 110. A gaming device 100 may take any form, including a video gaming machine, a mechanical or electro-mechanical slot machine, electronic table system, video lottery terminal, handheld gaming device, or the like.

The gaming device 100 communicates with an award server 200. In one optional embodiment, illustrated in FIG. 2, an award server 200 includes an award server processor 202 in communication with an award server communication device 204.

The award server 200 may optionally incorporate, or communicate with, a database storage device 206 that stores player records. For example, in an optional embodiment, the player records may be player tracking records (also referred to as player accounts, player rewards accounts, player loyalty accounts, or the like). In one such optional embodiment, the player records may be accessible to the award server 200. In a further optional embodiment, the award server 200 may be permitted to read from, write to, or read from and write to the player records.

Figure 2:
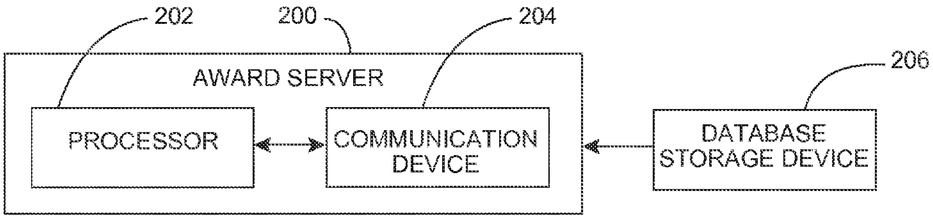
FIG. 2 is a block diagram of an award server according to an embodiment of the present invention.

Referring generally to FIG. 2, the award server 200 may take any form. For example, in an optional embodiment, the award server 200 is a web server accessible through a world wide web of web servers on the Internet. Optionally, the award server 200 is a secure web server that is accessible through a predefined security protocol. Alternatively, the award server 200 is an unsecured web server that is openly accessible. In any case, the award server 200 communicates with the gaming device 100 by transmitting data to, and receiving data from, the gaming device 100. The transmission and reception of data at the award server 200 may be conducted directly with the gaming device 100 or via a network. More specifically, the award server communication device 204 exchanges communication directly or indirectly with the gaming device communication device 104.

More specifically, in one optional embodiment, the gaming device 100 may communicate directly to an award server 200 such as through a direct connection. For example, in one such optional embodiment, the gaming device 100 communicates directly with the award server 200, such as through Bluetooth™, or other communication protocol.

In another optional embodiment, the gaming device 100 communicates to an award server 200 through a network, such as an intranet, local area network, wide area network, virtual private network ("VPN"), or other computer network. For example, referring to FIGS. 4-5, in one optional embodiment the gaming device 100 communicates with an award server 200 through a network. More specifically, a gaming device 100 communicates via a gaming device communication device 104 to an award server communication device 204 at an award server 200. Optionally, the network includes intermediate servers, such as Internet service provider ("ISP") servers, web servers, or the like (not shown).

Figure 3:
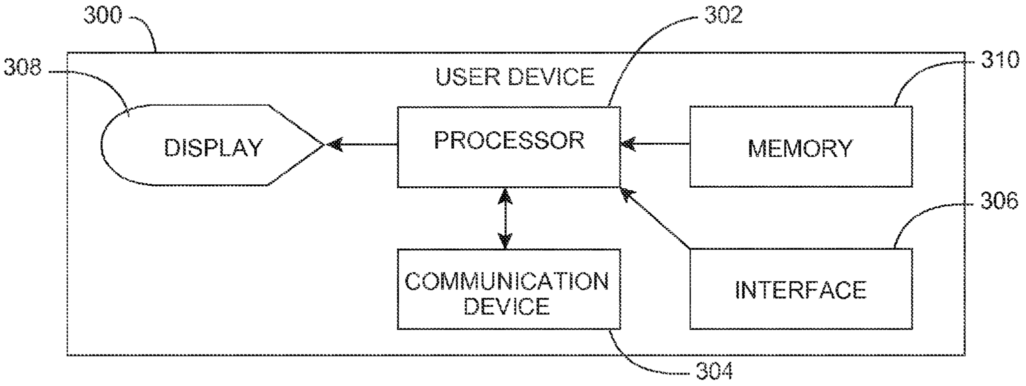
FIG. 3 is a block diagram of a user device according to an embodiment of the present invention.

Referring to FIG. 3, the award server 200 also communicates with a user device 300. The user device 300 may take any form, including a personal computer, video game console, mobile phone, tablet device, interactive television, kiosk, or the like. The user device 300 optionally includes a user device processor 302 in communication with a user device memory 310 that stores program instructions executable by the user device processor 302. Optionally, the user device 300 also includes a user device interface 306, user device display 308, and user device communication device 304 in communication with, and under the control of, the user device processor 302.

Figure 4:
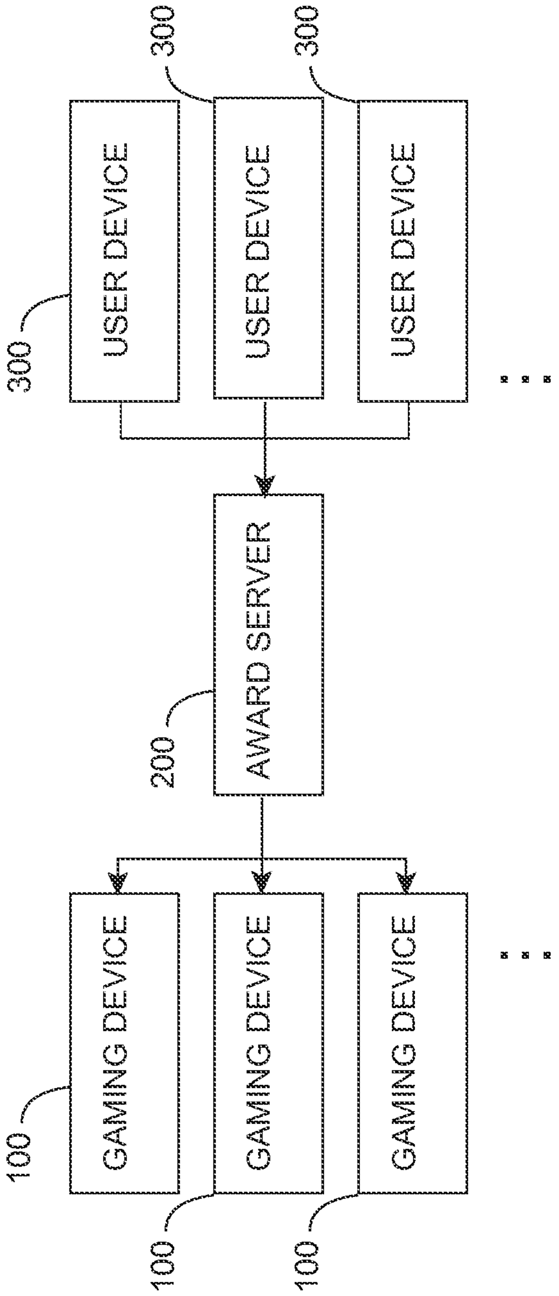
FIG. 4 is a block diagram of a system according to an embodiment of the present invention.
Figure 5:
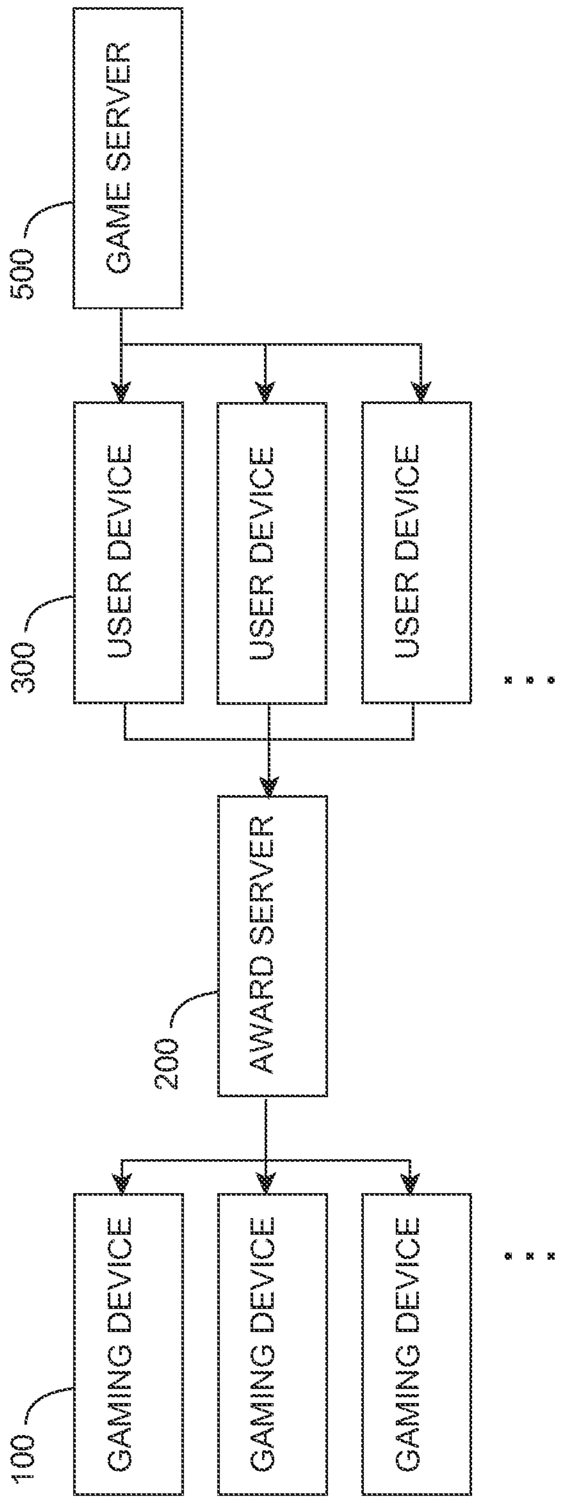
FIG. 5 is a block diagram of a system according to an embodiment of the present invention.

Optional embodiments of methods for configuring a system are illustrated in FIGS. 4 and 5. In one optional embodiment illustrated in FIG. 4, a system may include a user device 300 in communication with an award server 200 which, in turn, is in communication with a gaming device 100. As illustrated in FIG. 4, in an optional embodiment, an award server 200 may be configured to communicate with a plurality of gaming devices 100 and user devices 300 serially and/or simultaneously. In the optional embodiment of FIG. 4, a user device 300 may be configured to conduct a game application. That is, in one such optional embodiment, the user device memory 310 may store a game application which is executed by the user device processor 302 to produce an outcome which may be displayed at the user device display 308. The outcome of such a game application may include an escrow award, as discussed in greater detail below.

In one optional embodiment illustrated in FIG. 5, a system may include a user device 300 in communication with an award server 200 which, in turn, is in communication with a gaming device 100. Additionally, a user device 300 communicates with a game server 500. Like the system of FIG. 4, a system according to the optional embodiment of FIG. 5 may be configured to include a plurality of gaming devices 100 communicating with a game server 500, as well as a plurality of gaming devices 100 and user devices 300 communicating with an award server 200. In the optional embodiment of FIG. 5, a game application may be executed at a game server, with user devices 300 configured merely to display and/or receive input for the remotely executed game application. That is, in one such optional embodiment, the game server 500 executes a game application, and the user device processor 302 receives the outcome of the game application which may be displayed at the user device display 308. Again, the outcome of such a game application may include an escrow award, as discussed in greater detail below.

Figure 6:
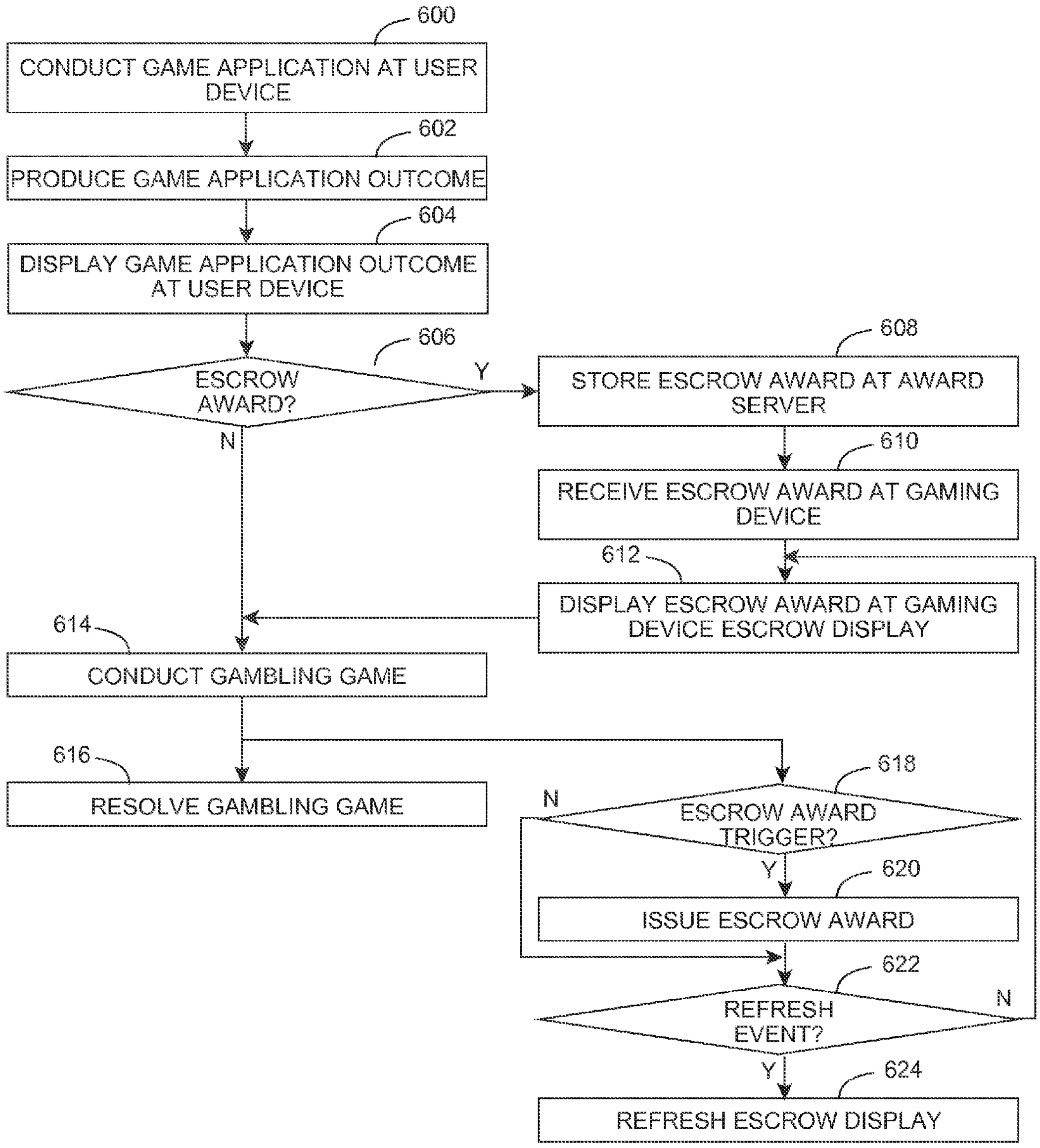
FIG. 6 is a flowchart of a method according to an embodiment of the present invention.
Figure 7:
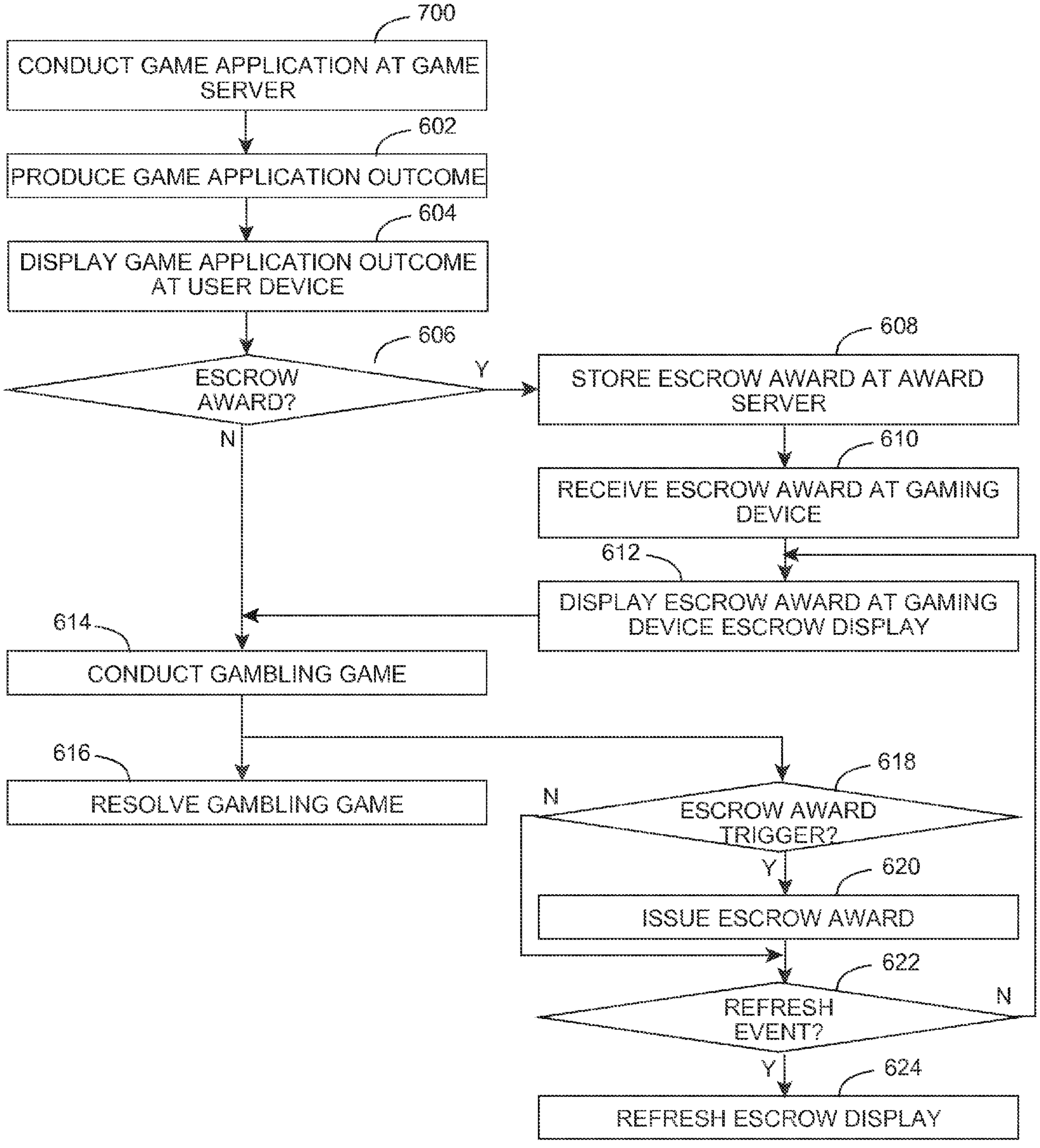
FIG. 7 is a flowchart of a method according to an embodiment of the present invention.

Turning to FIGS. 6 and 7, a method according to an embodiment of the present invention includes conducting a game application. As illustrated in FIG. 6, the game application may be conducted 600 at a user device 300 or, as illustrated in FIG. 7, the game application may be conducted 700 at a game server 500 in communication with a user device 300.

The game application may be a real-money wagering game or a "free-to-play" game. As used in this description, real-money wagering games are games that require a wager that is staked on the outcome of a event which may produce a prize. Examples of real-money wagering games could include social card games (e.g., player-banked card games), video card games (e.g., house-banked card games), slot games, wheel games, dice games, tile games, or the like, in which at least one wager in the form of, or representing, real money is placed on the outcome of the game may result in a prize based on the placement of the wager. It should be noted that real-money wagering games include both chance games and skill games in which a wager (or entry fee) is received and a prize issued to the winner. Examples of skill games that could be conducted as real-money wagering games could include poker tournaments, trivia games, math games, word games, logic puzzles, or the like.

As used in this description, "free-to-play" games are games in which play is free, or is compensated through a means other than wagering. That is, "free" does not necessarily mean uncompensated, since free-to-play games may be paid for by charging a download fee, requiring the player to buy (e.g., spend real money for) game credits, assessing a fee to activate certain features within the free-to-play game, charging a fee to remove advertisements, assessing a subscription fee, or the like. Also, it should be noted that free-to-play games may include both skill games and chance games, so long as either the real-money wager or the prize are eliminated. For example, casino games may be conducted in a free-to-play manner if the wagers are placed using fictional game credits rather than real money or the prizes are issued in fictional game credits rather than real money. Thus, to briefly summarize, real-money wagering games require a real-money wager to be staked on the outcome of the game which may result in a prize, while free-to-play games include any game in which a real-money wager is not received or a prize is not awarded.

Referring again to FIGS. 6 and 7, an outcome is produced 602 as a result of the conduct of the game application. In an optional embodiment, the outcome is displayed 604 at the user device 300. Among the outcomes possible in the game application is at least one escrow award. An escrow award is an award that is not issued by the user device 300 although it may be generated and/or displayed at the user device 300. It is contemplated that the escrow award may be awarded alone or in combination with another award that is issued by the user device 300. For example, the user device 300 may display that the game application outcome resulted in an escrow award plus 250 game credits. In such an example, the 250 game credits would be added to available game credits for the game application, whereas the escrow award would be stored at an award server 200.

The escrow award may take any form. For example, an escrow award may be a quantity, such as $500, a game feature, such as 10 free games, an in-kind award, such as a free airline ticket, or the like. It is also contemplated that the escrow award may be a "mystery" award insofar as the escrow award may be fixed, but not displayed at the user device display 308. When a determination is made that a game outcome has resulted 606 in an escrow award, the escrow award is stored at an award server 200 rather than being issued at the user device 300. In this regard, it is contemplated that the escrow award may be communicated from the user device 300 to the award server 200, from a game server 500 to an award server 200, or from any other source.

The award server 200 receives and stores 608 an escrow award. In an optional embodiment, the award server 200 incorporates, or communicates with, a database storage device 206 where the escrow award is stored in association with a player identifier. The player identifier may take any form, such as a name, player club number, account name, account number, phone number, device serial number, IP address, email address, or the like. The player identifier may also be associated with a verification means, such as a password, personal identification number ("PIN"), biometric data, or the like. In such an optional embodiment, a player identifier (and verification means, if any) may be received at the user device 300. When an escrow award is received at the award server 200, it may be accompanied by the player identifier. Using the player identifier, the escrow award may be stored in a database of player records associated with player identifiers.

In an optional embodiment, player records may be accessible to transfer escrow awards, e.g., share, give, or the like. In one such optional embodiment, in one such optional embodiment, a transfer request may be received at an award server 200, optionally from a user device 300. In one example, an escrow award may be shared so that multiple player identifiers may be associated with the escrow award. In such an optional embodiment, a transfer request may include the player identifier of the sharer associated with an escrow award and a player identifier of the sharee. In response to the transfer request to share the escrow award, the award server associates the sharee's player identifier with the escrow award. In another example, an escrow award may be given so that a recipient's player identifier may be associated with the escrow award. In such an optional embodiment, a transfer request may include the player identifier of the giver associated with an escrow award and a player identifier of the recipient. In response to the transfer request to share the escrow award, the award server associates the recipient's player identifier with the escrow award and disassociates the giver's player identifier with the escrow award.

A player record may also include a social media profile. In an optional embodiment, sharing, giving, or announcing escrow awards may be effected through the social media network associated with the social media profile. Such shares, gifts, announcements, or the like may be in addition to, or in place of, requests made directly to the award server 200.

A gaming device 100, which is separate from the user device 100 and the award server 200, receives 610 an escrow award from the award server 200. As previously discussed, the award server may communicate with the gaming device directly or via a network server. In one optional embodiment, the escrow award is received at the gaming device 100 from the award server 200 in response to input received through the gaming device interface 106. For example, a player identifier may be entered through the gaming device interface 106 which is transmitted to the award server 200 to retrieve the escrow award(s) associated with the player identifier. As may be appreciated, the player identifier may be entered manually, such as through a keyboard, keypad, button panel, touchscreen, or the like. Alternatively, the player identifier may be read from biometric data, a magnetic stripe card, radio frequency identification ("RFID") transmitter, or the like. In an optional embodiment, input may be received through the gaming device interface 106 to retrieve or decline to retrieve one or more of the escrow awards associated with the player identifier.

At least one escrow award is displayed 612 at the gaming device escrow display 108. It is contemplated that a plurality of escrow awards may be displayed 612 at the gaming device escrow display 108. When a plurality of escrow awards is displayed 612 by a gaming device escrow display 108, the escrow awards may be displayed simultaneously, e.g., on a single screen, or serially, e.g., on multiple different screens. Additionally, the escrow awards available to be won may include: all the escrow awards displayed at the gaming device escrow display 10; a randomly determined escrow award from the escrow awards displayed at the gaming device escrow display 108; an escrow award in a predetermined sequence of escrow awards; or the like. In a further optional embodiment, input may be received through a gaming device interface 106 to select the escrow award(s) available to be won. For example, a plurality of escrow awards may be received from an award server 200 and input may be received through a gaming machine interface 106 to determine a sequence of escrow awards, a subset of escrow awards, or a single escrow award from a pool of available escrow awards to be displayed on the escrow display 108 which are eligible to be awarded in the event of a escrow award trigger (as described in greater detail below).

As noted above, the gaming device escrow display 108 may be separate from, or incorporated into, the gaming device primary display 110. It should be noted that, in one optional embodiment, display of the escrow award on the gaming device escrow display is not a sufficient condition for the gaming device 100 to award the escrow award. That is, in such an optional embodiment, the escrow award displayed at the escrow display is merely a possible award that may be obtained through a gambling game conducted at the gaming device 100. As discussed in greater detail below, the escrow award may only be awarded upon the occurrence of an escrow award trigger.

A gambling game is conducted 614 at a gaming device 100. In an optional embodiment, the gambling game is conducted and displayed at a primary display 110 of the gaming device 100. Optionally, the gambling game includes receipt of input, such as play selections, wager designations, or the like, through a gaming device interface 106. For example, in one optional embodiment, the gambling game is conducted in response to receipt of a wager. Optionally, the wager (or a designation of the wager) may be received through the gaming device interface 106. In an optional embodiment, an escrow award feature, i.e., eligibility to win escrow awards through the gaming device 100, is included in the wager assessed for the base gambling game. In another optional embodiment, an escrow award feature may require an additional wager or consideration of some form (such as a "sixth coin" to activate the feature, a side bet, or the like).

The gambling game is conducted according to a pre-programmed set of game rules stored at the gaming device memory 112. Optionally, the gambling game is of a type in which the outcome of the gambling game is dependent, at least in part, on a random number generated by the random number generator. For example, in a gaming device 100 programmed to conduct a card game, the cards dealt may depend, at least in part, on the output of a random number generator. Similarly, in a gaming device conducting a reel slot game, the reel symbols displayed may depend, at least in part, on the output of a random number generator.

In any case, an outcome of the gambling game is used to resolve 616 the gambling game. It is noted that by "outcome," the present invention contemplates any outcome that may be produced in a game. For example, "outcome" may include any occurrence in a game, including a random occurrence, a primary game outcome, or a secondary game outcome that is produced as a result of, contingent upon, or temporally after a primary game outcome is produced. Secondary game outcomes may be produced through such procedures as bonuses for particular outcomes, secondary games, mystery bonuses, random triggers, or any other occurrence apart from the primary game.

A determination is made 618 whether an escrow award trigger has occurred. In one optional embodiment, the escrow award trigger is tied to the outcome or an event in the conduct of a gambling game. For example, an escrow award trigger may include the appearance of a particular game symbol (e.g., playing card, reel symbol, or the like). Similarly, an escrow award trigger may include a particular outcome, such as a particular playing card hand, reel symbol combination, or the like. In an additional or alternate optional embodiment, the escrow award trigger may be a random event that is not tied to the outcome of the game. It is contemplated that the escrow award trigger may occur during a game, before a game, after a game, or at any other time, depending on the optional embodiment. In an optional embodiment in which multiple escrow awards are eligible to be won, different escrow awards may share the same escrow award trigger or may have different escrow award triggers, depending on the optional embodiment.

When an escrow award trigger occurs, the escrow award is issued 620 at the gaming device 100. As previously noted, the escrow award may take any form. For example, the escrow award may be an amount of money or game credits, a good or service, a game feature (such as free games, games with an enhanced pay table, a second screen or bonus game, or the like), or any other type of prize.

An escrow award may be held at the escrow display 108 until a predetermined occurrence. For example, an escrow award may be held at the escrow display 108 until an escrow display refresh event occurs 622. An escrow display refresh event may take any form. In one example, an escrow display refresh event occurs when an escrow award trigger occurs. That is, after an escrow award trigger causes the issuance of the escrow award at the gaming device 100, the escrow display 108 at the gaming device 100 may be refreshed. In another example, an escrow display refresh event may occur after a quantity of games. In one such optional embodiment, the quantity of games is predetermined, e.g., an escrow display refresh event occurs after a fixed quantity of gambling games. In another optional embodiment, the quantity of games is random, e.g., an escrow display refresh event occurs after a randomly determined quantity of gambling games. As may be appreciated, many other types of escrow display refresh events may be defined, including events based on time, outcome(s) of one or more gambling games, events within the gambling game, or the like.

In an optional embodiment, an escrow display refresh event may also include removal of a player identifier from the gaming device 100. That is, in one optional embodiment, a player identifier is received at a gaming device 100 and escrow awards are received from the award server 200 associated with the received player identifier. In one optional embodiment, the escrow award(s) received from the award server 200 are held at the escrow display 108 of the gaming device 100 until the player identifier is removed from the gaming machine 100, such as by removing a player rewards card, logging off, or the like. Again, escrow display refresh events may be coupled. For example, in an optional embodiment, an escrow award may be held at an escrow display 108 until a quantity of gambling games has been conducted (whether that quantity is fixed or random) or removal of the player identifier from the gaming device 100, whichever occurs first. In an optional embodiment, unused games may be lost or saved. That is, in one optional embodiment, if a player identifier is removed from the gaming device 100 with, for example, five games remaining in which to win the escrow award, the escrow award may be disabled, i.e., the five games of eligibility remaining may be lost. In another optional embodiment, the five games may be saved for use on the same or different gaming device 100. For example, in one such optional embodiment, the records stored at the award server 200 or a database connected thereto may store a record of remaining eligibility of any escrow award that has been partially used. Thus, in such an example, when the escrow award with five games of eligibility remaining is received at the same or different gaming device 100, the escrow award may be displayed at the escrow display 108 for up to five games (assuming no other escrow display refresh event occurs during those five games).

Additionally, a plurality of escrow display refresh events may be defined and applied. It is contemplated that such escrow display refresh events may be of different types and may be combined in any fashion. For example, in one such optional embodiment, an escrow award may be held at an escrow display 108 for a fixed quantity of gambling games, or a fixed quantity of time, whichever occurs first.

In an optional embodiment, the gaming device escrow display 108 is refreshed 624 after an escrow display refresh event. When the escrow display 108 is refreshed, the escrow display 108 may display a blank screen or, in an alternate optional embodiment in which a plurality of escrow awards are serially displayed (either alone or in batches), another escrow award or subset of escrow awards is displayed from among the escrow awards received from the award server 200. In an optional embodiment, the determination of which escrow award or subset of escrow awards to display at an escrow display 108 and/or when to display the escrow award at the escrow display 108 may be determined by the gaming device processor 102 by itself or by using input received at the gaming device interface 106, or a combination thereof. It is also noted that escrow display refresh events may cause a partial refresh of the escrow display 108. For example, in an optional embodiment, different escrow awards may have different escrow display refresh events associated therewith. In one such optional embodiment, an escrow display refresh event may cause one escrow award displayed at the escrow display 108 to be removed, replaced, or the like, while other escrow awards displayed at the escrow display 108 may remain on the escrow display 108 until their respective escrow display refresh events occur.

While certain embodiments of the present invention have been shown and described it is to be understood that the present invention is subject to many modifications and changes without departing from the spirit and scope of the claims presented herein.

We claim:

1. A gaming system comprising:

a user device comprising:

a user device processor;

a user device display; and a user device memory in communication with said user device processor, said user device memory configured to store program instructions executable by said user device processor to display an outcome of a game application at said user device display, wherein said outcome of said game application may include an escrow award which is displayed at said user device without issuing said escrow award at said user device;

an award server in communication with said user device comprising:

an award server processor; and an award server memory in communication with said award server processor, said award server memory configured to store program instructions executable by said award server processor to receive an escrow award from said user device and store said escrow award in association with a player identifier; and at least one gaming device in communication with said award server, said at least one gaming device separate from said award server and operating independently from said award server, comprising:

a gaming device processor including a random number generator, said random number generator configured to generate a random number used, at least in part, to generate an outcome for a gambling game;

a gaming device interface in communication with said gaming device processor;

an escrow display in communication with said gaming device processor; and a gaming device memory in communication with said gaming device processor configured to store at least one escrow award trigger and program instructions executable by said gaming device processor to conduct the steps of:

receiving said escrow award from said award server;

displaying said escrow award on said escrow display;

receiving a wager on said gambling game through said gaming device interface;

conducting said gambling game including randomly selecting an outcome for said gambling game by said gaming device processor;

resolving said wager by said gaming device processor based on said outcome of said gambling game;

determining by said gaming device processor whether said at least one escrow award trigger has occurred; and issuing said escrow award at said at least one gaming device when said at least one escrow award trigger occurs.

2. The system of claim 1 wherein said instructions executable by said gaming device processor further comprise holding said escrow award at said escrow display until the occurrence of said at least one escrow award trigger.

3. The system of claim 1 wherein said instructions executable by said gaming device processor further comprise:

storing at least one escrow display refresh event in said gaming device memory; and holding said escrow award at said escrow display until the occurrence of said at least one escrow award trigger or an escrow display refresh event, whichever occurs first.

4. The system of claim 3 wherein said escrow display refresh event includes a predefined quantity of gambling games such that said escrow award is available to be issued for only said predefined quantity of gambling games.

5. The system of claim 3 wherein said escrow display refresh event includes a random quantity of gambling games such that said escrow award is available to be issued for only said random quantity of gambling games.

6. The system of claim 1 wherein said escrow award is associated with a player identifier and said instructions executable by said gaming device processor further comprise:

receiving a player identifier through said gaming device interface such that said escrow award received from said award server is an escrow award associated with said player identifier received at said gaming device;

storing at least one escrow display refresh event in said gaming device memory, wherein said escrow display refresh event includes removal of said player identifier received at said gaming device such that said escrow award is available to be issued only in gambling games conducted while in receipt of said player identifier associated with said escrow award; and holding said escrow award at said escrow display until the occurrence of said at least one escrow award trigger or an escrow display refresh event, whichever occurs first.

7. The system of claim 1 wherein said at least one escrow award trigger is determined, at least in part, by said outcome of said gambling game generated by said gaming device processor.

8. The system of claim 1 wherein said at least one escrow award trigger is independent of said outcome of said gambling game generated by said gaming device processor.

9. The system of claim 1 wherein said program instructions executable by said award server processor further comprise:

receiving a transfer request at said award server including a first player identifier associated with an escrow award and a second player identifier; and associating said escrow award with said second player identifier by said award server processor in response to said transfer request.

10. The system of claim 9 wherein said program instructions executable by said award server processor further comprise disassociating said escrow award with said first player identifier by said award server processor in response to said transfer request.

11. A gaming system comprising:

a user device comprising:

a user device processor;

a user device display; and a user device memory in communication with said user device processor, said user device memory configured to store program instructions executable by said user device processor to display an outcome of a game application at said user device display, wherein said outcome of said game application may include an escrow award which is displayed at said user device without issuing said escrow award at said user device;

an award server in communication with said user device comprising:

an award server processor; and an award server memory in communication with said award server processor, said award server memory configured to store program instructions executable by said award server processor to receive an escrow award from said user device and store said escrow award in association with a player identifier; and at least one gaming device in communication with said award server, said at least one gaming device separate from said award server and operating independently from said award server, comprising:

a gaming device processor including a random number generator, said random number generator configured to generate a random number used, at least in part, to generate an outcome for a gambling game;

a gaming device interface in communication with said gaming device processor;

an escrow display in communication with said gaming device processor; and a gaming device memory in communication with said gaming device processor configured to store at least one escrow award trigger and program instructions executable by said gaming device processor to conduct the steps of:

receiving said escrow award from said award server;

displaying said escrow award on said escrow display and holding said escrow award at said escrow display until at least the occurrence of said at least one escrow award trigger;

receiving a wager on said gambling game through said gaming device interface;

conducting said gambling game including randomly selecting an outcome for said gambling game by said gaming device processor;

resolving said wager by said gaming device processor based on said outcome of said gambling game;

determining by said gaming device processor whether said at least one escrow award trigger has occurred; and issuing said escrow award at said at least one gaming device when said at least one escrow award trigger occurs.

12. The system of claim 11 wherein said instructions executable by said gaming device processor further comprise:

storing at least one escrow display refresh event in said gaming device memory;

holding said escrow award at said escrow display until the occurrence of said at least one escrow award trigger or an escrow display refresh event, whichever occurs first; and removing said escrow award from said escrow display upon the occurrence of said at least one escrow award trigger or an escrow display refresh event, whichever occurs first.

13. The system of claim 12 wherein said escrow display refresh event includes a predefined quantity of gambling games such that said escrow award is available to be issued for only said predefined quantity of gambling games.

14. The system of claim 12 wherein said escrow display refresh event includes a random quantity of gambling games such that said escrow award is available to be issued for only said random quantity of gambling games.

15. The system of claim 11 wherein said escrow award is associated with a player identifier and said instructions executable by said gaming device processor further comprise:

receiving a player identifier through said gaming device interface such that said escrow award received from said award server is an escrow award associated with said player identifier received at said gaming device;

storing at least one escrow display refresh event in said gaming device memory, wherein said escrow display refresh event includes removal of said player identifier received at said gaming device such that said escrow award is available to be issued only in gambling games conducted while in receipt of said player identifier associated with said escrow award;

holding said escrow award at said escrow display until the occurrence of said at least one escrow award trigger or an escrow display refresh event, whichever occurs first; and removing said escrow award from said escrow display upon the occurrence of said at least one escrow award trigger or an escrow display refresh event, whichever occurs first.

16. The system of claim 11 wherein said escrow award trigger is determined, at least in part, by said outcome of said gambling game generated by said gaming device processor.

17. The system of claim 11 wherein said escrow award trigger is independent of said outcome of said gambling game generated by said gaming device processor.

18. The system of claim 11 wherein said program instructions executable by said award server processor further comprise:

receiving a transfer request at said award server including a first player identifier associated with an escrow award and a second player identifier; and associating said escrow award with said second player identifier by said award server processor in response to said transfer request.

19. The system of claim 18 wherein said program instructions executable by said award server processor further comprise disassociating said escrow award with said first player identifier by said award server processor in response to said transfer request.

20. A gaming system comprising:

a user device comprising:

a user device processor;

a user device display; and a user device memory in communication with said user device processor, said user device memory configured to store program instructions executable by said user device processor to display an outcome of a game application at said user device display, wherein said outcome of said game application may include an escrow award which is displayed at said user device without issuing said escrow award at said user device;

an award server in communication with said user device comprising:

an award server processor; and an award server memory in communication with said award server processor, said award server memory configured to store program instructions executable by said award server processor to receive an escrow award amount from said user device and store said escrow award amount in association with a player identifier; and at least one gaming device in communication with said award server, said at least one gaming device separate from said award server and operating independently from said award server, comprising:

a gaming device processor including a random number generator, said random number generator configured to generate a random number used, at least in part, to generate an outcome for a gambling game;

a gaming device interface in communication with said gaming device processor;

an escrow display in communication with said gaming device processor; and a gaming device memory in communication with said gaming device processor configured to store at least one escrow award trigger, at least one escrow display refresh event, and program instructions executable by said gaming device processor to conduct the steps of:

receiving a player identifier through said gaming device interface;

receiving said escrow award from said award server associated with said player identifier received at said gaming device;

displaying said escrow award on said escrow display and holding said escrow award at said escrow display until the occurrence of said at least one escrow award trigger or an escrow display refresh event, whichever occurs first;

receiving a wager on said gambling game through said gaming device interface;

conducting said gambling game including randomly selecting an outcome for said gambling game by said gaming device processor;

resolving said wager by said gaming device processor based on said outcome of said gambling game;

determining by said gaming device processor whether said at least one escrow award trigger has occurred;

issuing said escrow award at said at least one gaming device when said at least one escrow award trigger occurs;

determining by said gaming device processor whether said escrow display refresh event has occurred; and removing said escrow award from said escrow display when said escrow display refresh event occurs.

21. The system of claim 20 wherein said escrow award trigger is determined, at least in part, by said outcome of said gambling game generated by said gaming device processor.

22. The system of claim 20 wherein said escrow award trigger is independent of said outcome of said gambling game generated by said gaming device processor.

23. The system of claim 20 wherein said program instructions executable by said award server processor further comprise:

receiving a transfer request at said award server including a first player identifier associated with an escrow award and a second player identifier; and associating said escrow award with said second player identifier by said award server processor in response to said transfer request.

24. The system of claim 23 wherein said program instructions executable by said award server processor further comprise disassociating said escrow award with said first player identifier by said award server processor in response to said transfer request.

25. The system of claim 20 wherein said escrow display refresh event includes a predefined quantity of gambling games such that said escrow award is available to be issued for only said predefined quantity of gambling games.

26. The system of claim 20 wherein said escrow display refresh event includes a random quantity of gambling games such that said escrow award is available to be issued for only said random quantity of gambling games.

27. The system of claim 20 wherein said escrow display refresh event includes removal of said player identifier such that said escrow award is available to be issued only in gambling games conducted while in receipt of said player identifier associated with said escrow award.

* * * * *